US007267262B1

(12) United States Patent
Brown

(10) Patent No.: US 7,267,262 B1
(45) Date of Patent: Sep. 11, 2007

(54) METHOD AND APPARATUS CONFIRMING RETURN AND/OR PICK-UP VALUABLE ITEMS

(75) Inventor: Suzy Brown, Encinitas, CA (US)

(73) Assignee: Seecontrol, Inc., Menlo Park, CA (US)

( * ) Notice: Subject to any disclaimer, the term of this patent is extended or adjusted under 35 U.S.C. 154(b) by 57 days.

(21) Appl. No.: 10/213,263

(22) Filed: Aug. 5, 2002

Related U.S. Application Data

(60) Provisional application No. 60/310,567, filed on Aug. 6, 2001.

(51) Int. Cl.
*G06F 19/00* (2006.01)
*G06K 15/00* (2006.01)
*G08B 13/14* (2006.01)

(52) U.S. Cl. .................. 235/375; 235/378; 340/572.1; 340/5.61

(58) Field of Classification Search ................ 235/375, 235/385, 378; 340/10.1, 572.1–572.8, 5.92, 340/5.4–5.42, 5.61; 705/28, 1, 22, 29; 700/236; 902/14, 22
See application file for complete search history.

(56) References Cited

U.S. PATENT DOCUMENTS 4,661,806 A 4/1987 Peters et al.
4,961,533 A * 10/1990 Teller et al. ............. 177/25.19
5,038,023 A 8/1991 Saliga
5,151,684 A * 9/1992 Johnsen ................... 340/568.1
5,363,425 A 11/1994 Mufti
5,664,113 A * 9/1997 Worger et al. ................ 705/28
5,682,142 A 10/1997 Loosmore et al.
5,708,423 A 1/1998 Ghaffari et al.
5,777,884 A * 7/1998 Belka et al. ................ 700/225
5,828,322 A * 10/1998 Eberhard .................... 340/988
5,963,133 A * 10/1999 Monjo ..................... 340/572.1
5,963,134 A * 10/1999 Bowers et al. ........... 340/572.1
6,002,343 A * 12/1999 Auerbach et al. ........ 340/10.41
6,012,041 A 1/2000 Brewer et al.
6,148,291 A * 11/2000 Radican ....................... 705/28
6,169,483 B1 * 1/2001 Ghaffari et al. .......... 340/572.3
6,300,873 B1 10/2001 Kucharczyk et al.
6,429,776 B1 * 8/2002 Alicot et al. ............. 340/572.1
6,456,191 B1 * 9/2002 Federman .................. 340/10.2
6,476,708 B1 * 11/2002 Johnson ................... 340/10.34

(Continued)

FOREIGN PATENT DOCUMENTS

EP 0494 114 A 7/1992

(Continued)

*Primary Examiner*—Daniel Walsh
(74) *Attorney, Agent, or Firm*—Squire, Sanders & Dempsey LLP

(57) ABSTRACT

An RFID tag associated with an item (e.g., by being affixed thereto) eligible for return to a supplier is scanned to obtain item identification information. Thereafter, a notification message indicating that the item is available for pick-up is transmitted, for example to a supplier of the item. The notification message may be transmitted as any or all of: a facsimile message, a telephone message, a pager message, a voice synthesized message, an e-mail message, or an electronic message. Preferably, the notification message is automatically transmitted by a computer system, and may include at least a portion of the item identification information. Upon receipt of the notification message, an account may be credited to reflect return of the item.

5 Claims, 6 Drawing Sheets

U.S. PATENT DOCUMENTS

| | | | | |
|---|---|---|---|---|
| 6,483,427 | B1 * | 11/2002 | Werb | 340/10.1 |
| 6,536,659 | B1 * | 3/2003 | Hauser et al. | 235/375 |
| 6,600,418 | B2 * | 7/2003 | Francis et al. | 340/572.1 |
| 6,681,989 | B2 * | 1/2004 | Bodin | 235/383 |
| 6,704,690 | B2 * | 3/2004 | Koh et al. | 702/188 |
| 6,784,789 | B2 * | 8/2004 | Eroglu et al. | 340/10.6 |
| 6,845,909 | B2 * | 1/2005 | Bong et al. | 235/385 |
| 6,970,826 | B2 * | 11/2005 | Christensen et al. | 705/1 |
| 2001/0000019 | A1 * | 3/2001 | Bowers et al. | 340/572.1 |
| 2001/0037207 | A1 * | 11/2001 | Dejaeger | 705/1 |
| 2001/0037248 | A1 * | 11/2001 | Klein | 705/22 |
| 2001/0042055 | A1 * | 11/2001 | Didriksen et al. | 705/407 |
| 2001/0051905 | A1 | 12/2001 | Lucas | |
| 2002/0008140 | A1 * | 1/2002 | Reynolds et al. | 235/385 |
| 2002/0010689 | A1 * | 1/2002 | Tibbs et al. | 705/408 |
| 2002/0019777 | A1 * | 2/2002 | Schwab et al. | 705/26 |
| 2002/0030599 | A1 * | 3/2002 | Manneschi et al. | 340/572.7 |
| 2002/0032613 | A1 * | 3/2002 | Buettgenbach et al. | 705/26 |
| 2002/0070862 | A1 * | 6/2002 | Francis et al. | 340/572.1 |
| 2002/0105424 | A1 * | 8/2002 | Alicot et al. | 340/572.1 |
| 2002/0143635 | A1 * | 10/2002 | Goodwin, III | 705/22 |
| 2002/0143668 | A1 * | 10/2002 | Goodwon, III | 705/28 |
| 2002/0167397 | A1 * | 11/2002 | Eroglu et al. | 340/10.6 |
| 2002/0178076 | A1 * | 11/2002 | Ross | 705/26 |
| 2002/0184106 | A1 * | 12/2002 | Christensen et al. | 705/26 |
| 2003/0135432 | A1 * | 7/2003 | McIntyre et al. | 705/28 |
| 2003/0163394 | A1 * | 8/2003 | Munn | 705/28 |
| 2004/0049396 | A1 * | 3/2004 | Hope | 705/1 |
| 2004/0084527 | A1 * | 5/2004 | Bong et al. | 235/385 |
| 2004/0088230 | A1 * | 5/2004 | Elliott et al. | 705/28 |
| 2004/0172260 | A1 * | 9/2004 | Junger et al. | 705/1 |
| 2004/0193438 | A1 * | 9/2004 | Stashluk et al. | 705/1 |
| 2004/0252030 | A1 * | 12/2004 | Trimble et al. | 340/825.36 |
| 2005/0091126 | A1 * | 4/2005 | Junger | 705/26 |
| 2005/0103842 | A1 * | 5/2005 | Bong et al. | 235/385 |
| 2005/0206523 | A1 * | 9/2005 | Engellenner | 340/572.1 |
| 2005/0289032 | A1 * | 12/2005 | Hoblit | 705/35 |
| 2006/0015408 | A1 * | 1/2006 | Brown | 705/22 |
| 2006/0180665 | A1 * | 8/2006 | Garber et al. | 235/385 |
| 2006/0255951 | A1 * | 11/2006 | Roeder et al. | 340/572.7 |
| 2007/0080930 | A1 * | 4/2007 | Logan et al. | 345/156 |

FOREIGN PATENT DOCUMENTS

| | | |
|---|---|---|
| GB | 2 342 208 A | 4/2000 |
| WO | WO89/05549 | 6/1989 |

* cited by examiner

METHOD AND APPARATUS CONFIRMING RETURN AND/OR PICK-UP VALUABLE ITEMS

RELATED APPLICATION

The present application is related to and hereby claims the priority benefit of U.S. Provisional Application No. 60/310,567 entitled Method and Apparatus for Confirming Return and/or Pick-Up of Valuable Items, filed Aug. 6, 2001 by the present inventor.

FIELD OF THE INVENTION

The present invention relates to the field of remote locator systems, such as radio frequency identification (RFID) devices and corresponding transceiver systems, and the use of such systems in the monitoring, control and management of materials to provide real-time and near real-time information regarding the location and status of such materials.

BACKGROUND

Radio frequency identification (RFID) is an area of automatic identification that has been gaining favor among a variety of industry groups in recent years and is now generally recognized as a means of enhancing data handling processes, complimentary in many ways to other data capture technologies such as bar coding. A range of devices and associated systems are available to satisfy a broad range of applications. Despite this diversity, the principles upon which RFID is based are quite straight forward, even though the technology and technicalities concerning the way in which it operates can be quite sophisticated.

The object of any RFID system is to store data in one or more of a variety of transponders, commonly known as tags, and to retrieve this data, by machine-readable means, at a suitable time and place to satisfy particular application needs. Data within a tag may provide identification for an item in manufacture, goods in transit, a location, and/or the identity of an animal or individual. By including additional data the prospect is provided for supporting applications through item-specific information or instructions immediately available upon reading the tag. For example, the color of paint for a car body entering a paint spray area on a production line can be encoded in a tag for reading (and subsequent utilization) as the car body enters the painting area.

In addition to the tags themselves, an RFID system requires some means of reading or interrogating the tags (often called a "reader" although it generally includes some form of transmitter for interrogating the tags) and some means of communicating the data to a host computer or information management system. A system may also include a facility for entering or programming data into the tags, if the manufacturer does not undertake this operation at the source. Quite often an antenna is distinguished as if it were a separate part of an RFID system. While its importance justifies this attention, antennas are perhaps better viewed as features that are present in both readers and tags, essential for the communication between the two.

Communication of data between tags and a reader is by wireless communication. Two common methods distinguish and categorize RFID systems, one based upon close proximity electromagnetic or inductive coupling and one based upon propagating electromagnetic waves. Recently, capacitive coupling schemes have also been introduced. In any event, coupling is via the antenna structures described above and while the term antenna is generally considered more appropriate for propagating systems it is also loosely applied to inductive systems.

FIG. 1A illustrates a conventional RFID system that relies on inductive coupling to transmit stored information to a reader. As shown, the tag 10 is placed so that its antenna 12 is within a radio frequency (RF) field created by the reader's antenna 14. As a current is passed through the antenna 14, the RF field 16 is generated. The area of the RF field 16 will depend on the amount of current passed through antenna 14, the type of materials that are used to construct antenna 14, and the size and type of antenna 14 that is used. As the tag's antenna 12 passes through the RF field 16, a current is generated in the antenna 12 and that current is used to power the tag components, resulting in the stored data being transmitted. If the reader uses a time varying current within antenna 14, this process will occur even if the tag 10 is stationary. Because the tag 10 does not include its own power source to carry out transmissions of data, the tag is referred to as a passive RFID tag.

FIG. 1B illustrates the use of an active tag 18, which allows for coupling through propagating electromagnetic waves. In this case, the tag 18 includes its own power source (e.g., a battery) which allows the tag to transmit its stored data to a reader antenna 20 directly, without having to rely on power generated from a radiated RF field. This allows for reading operations over extended ranges from that usually provided by passive tags that rely on inductive coupling.

To transfer data efficiently via the air that separates the two communicating antennas generally requires that the data be superimposed upon a carrier wave, as is common in the communication arts. This process is referred to as modulation, and various schemes are available for this purpose, each having particular attributes that favor their use. Commonly employed modulation techniques for RFID tags include amplitude shift keying (ASK), frequency shift keying (FSK) and phase shift keying (PSK). Common carrier frequencies include high frequencies (HF, approximately 3-30 MHz), very high frequencies (VHF, approximately 30-300 Mhz) and ultra high frequencies (UHF, frequencies above 300 MHz). Higher carrier frequencies allow for faster data rates, but are generally limited to line-of-sight applications. Commonly used commercial RFID systems operate at 13.56 MHz, while others operate at 915 MHz.

Having looked at some of the basics behind RFID technology, we turn now to some further details regarding the components that make up a conventional system. FIG. 2 illustrates an example of a conventional RFID system 22 that includes a transponder or tag 24 (which may be of the active or passive variety) with an antenna 26, and a reader/programmer 28 with an antenna 30. The word transponder, derived from the combination of TRANSmitter and resPONDER, reveals the function of the device. The tag 24 responds to a transmitted or communicated request for the data it stores by communicating information by wireless means across the space or air interface between the tag and the reader. The term also suggests the essential components that form an RFID system—tags and a reader or interrogator. Where interrogator is often used as an alternative to the term reader, a difference is sometime drawn on the basis of a reader together with a decoder and interface forming the interrogator.

The basic components of tag 24 are shown in FIG. 3. Generally speaking tags are fabricated as low power integrated circuits suitable for interfacing to external coils (i.e., antennas 26), or utilizing "coil-on-chip" technology, for data transfer and power generation (passive mode). Some analog circuitry 32 is generally included for these purposes. In addition, the tag may include a read-only memory (ROM) 34, random access memory (RAM) 36 and/or non-volatile programmable memory (often a form of Flash memory) 38 for data storage depending upon the type and sophistication of the device.

The ROM-based memory 34 is used to accommodate security data and the transponder operating system instructions which, in conjunction with the processor or processing logic 40, deals with the internal "house-keeping" functions such as response delay timing, data flow control and power supply switching. The RAM-based memory 36 may be used to facilitate temporary data storage during transponder interrogation and response. The non-volatile programmable memory 38 may take various forms, electrically erasable programmable read only memory (EEPROM) being typical. It is used to store the transponder data and needs to be non-volatile to ensure that the data is retained when the device is in its quiescent or power-saving "sleep" state.

Various data buffers (which are created in the volatile memory 36) may be used to temporarily hold incoming data following demodulation and outgoing data for modulation and interface with the tag antenna 26 (which itself is used to sense the interrogating field and, where appropriate, the programming field, and also serves as the means of transmitting the tag response to the interrogator). The interface circuitry 32 provides the facility to direct and accommodate the interrogation field energy for powering purposes in passive transponders and triggering of the tag response. Where programming is accommodated, facilities must be provided to accept the incoming data modulated signal and perform the necessary demodulation and data transfer processes.

RFID tags such as tag 24 come in a wide variety of physical forms, shapes and sizes. Animal tracking tags, inserted beneath the skin, can be as small as a pencil lead in diameter and ten millimeters or so in length. Tags can be screw-shaped to identify trees or wooden items, or credit card shaped for use in access applications (e.g., identity badges). The anti-theft hard plastic tags attached to merchandise in stores are a form of RFID tag, as are the heavy-duty rectangular transponders used to track intermodal containers, or heavy machinery, trucks, and railroad cars for maintenance and tracking applications.

Returning to FIG. 2, the reader/interrogator 28 can differ quite considerably in complexity, depending upon the type of tags being supported and the functions to be fulfilled. However, the overall function is to provide the means of communicating with the tags 24 and facilitating data transfer (a process generally known as "scanning"). Functions performed by the reader 28 may include quite sophisticated signal conditioning, parity error checking and correction. Once the signal from a tag 24 has been correctly received and decoded, algorithms may be applied to decide whether the signal is a repeat transmission, and may then instruct the transponder to cease transmitting. This is known as the "Command Response Protocol" and is used to circumvent the problem of reading multiple tags in a short amount of time. Using interrogators in this way is sometimes referred to as "Hands Down Polling". An alternative, more secure, but slower tag polling technique is called "Hands Up Polling", which involves the interrogator looking for tags with specific identities, and interrogating them in turn. This and other contention management techniques have been developed to improve the process of batch reading. A further approach may use multiple readers, multiplexed into one interrogator, but with attendant increases in costs.

Transponder programmers are the means by which data is delivered to tags capable of being programmed/reprogrammed. Programming is generally carried out off-line, at the beginning of a batch production run, for example. However, in some systems reprogramming may be carried out on-line, particularly if a tag is being used as an interactive portable data file within a production environment, for example. By combining the functions of a reader/interrogator and a programmer into a single unit 28, data may be read and appended or altered in the tag 24 as required.

Potential applications for RFID are many and varied. The attributes of RFID are complimentary to other data capture technologies and thus able to satisfy particular application requirements that cannot be adequately accommodate by alternative technologies. Principal areas of application for RFID that can be currently identified include: transportation and logistics, manufacturing and processing, and security. A range of miscellaneous applications may also be distinguished, some of which are steadily growing in terms of application numbers. They include: animal tagging, waste management, time and attendance, postal tracking, and road toll management. As standards emerge, technology develops still further, and cost reduction has spawned considerable growth in terms of application numbers.

One application that has received some attention from developers of RFID systems is that of inventory control. For example, U.S. Pat. No. 6,148,291 to Radican describes container and inventory monitoring methods and systems that provide logistical control of containers, shipping racks and resident and in-transit inventory. The methods and systems create and maintain real-time records of the location, movement and load status of containers, racks and inventory within facility boundaries and between facilities such as factories, assembly plants, warehouses, shipping yards and freight switching facilities. Information regarding container switching, unloading and loading activities is recorded and archived. A virtual inventory accounting is also provided.

Shipping containers, such as those discussed in U.S. Pat. No. 6,148,291, are often employed to transport other items from suppliers to users. Often times, these shipping containers are high value units and sometimes the value of the shipping container exceeds the value of the items being shipped therein. Because of the high value associated with these containers, the users (which need not necessarily be end users of the relevant products but may in fact be vendors thereof) are required to either purchase the shipping container (which purchase price may later be refunded (at least in part) if the container is later returned) or place a security deposit (which also may be refunded upon return of the shipping container) for the container with the supplier. Because manual record keeping is subject to human error, it is often the case that accounts are not properly credited, or that accounts are improperly credited, for the return, or failure to return as the case may be, of the shipping containers. The inventory monitoring and control system proposed in U.S. Pat. No. 6,148,291 does not address this problem.

Likewise, although U.S. Pat. No. 6,169,483 to Ghaffari et al., describes a self-checkout/self-check-in and electronic article surveillance (EAS) system, this system does not address the problem of proper accounting for returned shipping containers and the like. The Ghaffari system combines EAS tags with RFID tags and both are connected to articles of clothing and the like. The RFID tags are read, and after verification of an authorized transaction, a deactivation antenna is energized to deactivate the EAS tags, and a stored inventory database is updated. For returns, articles are deposited in an elongated housing and the RFID tags on the articles are read, the inventory database updated, and an activation antenna is energized to form an activation zone through which the articles pass as they fall through the housing, thus activating the attached EAS tags. In this way, in-store inventories can be updated, but there is no mechanism for automatically crediting customer accounts during a return process.

U.S. Pat. No. 6,195,006 to Bowers and Clare describes an article inventory control system for articles, such as books and the like, for use in a library. This system uses RFID tags attached to each article and each tag has a unique identification number for identifying the individual article. An inventory database tracks all of the tagged articles and maintains circulation status information for each article. Articles are checked out of the library using a patron self-checkout system. Checked out articles are returned to the library via patron self-check in devices, however, these devices do not have the capability of automatically updating a patron's account to reflect a timely return of an article.

U.S. Pat. No. 6,204,764 to Maloney describes an object tracking system for tracking the removal of objects from a location and the replacement of the objects at the location. The system includes a number of RFID tags, each attached to one of the objects to be tracked. When activated, the RFID tag of an object transmits a unique code identifying the object. A storage unit is provided at the location and the storage unit has a plurality of receptacles configured to receive objects replaced at the location. A computer-based controller is configured to receive the transmitted codes and determine, based thereon, the absence or presence and location of objects within the storage unit. However, no facilities are provided for automatically updating or crediting a user's account to reflect return of a tagged item.

SUMMARY OF THE INVENTION

In one embodiment, a process is introduced wherein an RFID tag associated with an item (e.g., by being affixed thereto) eligible for return to a supplier is scanned to obtain item identification information. Thereafter, a notification message indicating that the item is available for pick-up is transmitted, for example to a supplier of the item. The term "supplier" is used in the broadest sense to mean any person or entity involved in the supply chain for an item or items. Thus, a supplier may be a manufacturer, distributor, agent, shipper, courier, or other person or entity in the supply chain.

The notification message may be transmitted as any or all of: a facsimile message, a telephone message, a pager message, a voice synthesized message, an e-mail message, or an electronic message. Preferably, the notification message is automatically transmitted by a computer system, and may include at least a portion of the item identification information.

In general, the notification message will be transmitted to a notification address associated with the item identification information. This notification address may be a telephone number, a facsimile number, a pager number, an e-mail address, or a computer system address (e.g., a network or Internet address). The notification address may be obtained, using the item identification information, from a table stored in a computer readable medium, or, in some cases, from the RFID tag itself during the scanning operation. That is, the item identification information may include the notification address to which the notification message is transmitted.

The scanning process discussed above is preferably performed at the time an item is placed in an area designated for articles to be returned. This area may be a cabinet or it may simply be a designated area within a building, such as a storage room. In some cases, the area need not even be physically walled off from surrounding areas, so a cubicle space or indeed any otherwise unused floor space or shelf space, etc. can be designated as the "return area". In such cases, the return area will be defined by an electromagnetic threshold provided by an RFID scanning system so that tags within the boundary defined by this RFID scanning system are read. Of course, the tags may be active or passive tags, as appropriate and periodic rescanning of the RFID tags within the return area may be performed (e.g., to ensure items that were placed in the return area are still there).

In addition to the above, other RFID tags, for example tags associated with one or more persons handling the items to be returned, may be scanned to obtain person identification information. This person identification information may be associated with the item identification information in a computer readable database so as to keep track of which individuals are placing items in or removing items from the return area. The RFID tags (which may be included in identity cards or badges) may be scanned at a time when the associated individual delivers an item to the return area. In other cases, the person identification information may be obtained thorough the use of individual identity codes or passwords read from magnetic stripes associated with ID cards or badges or the like, or simply entered through a keyboard or other manual input device. In some cases, the person identity information may be used to grant or not grant access to the return area.

As indicated above, the present process further provides for automatically crediting an account to reflect return of the item upon receipt of the notification message. This may occur upon delivery of the item to the return area or at a later time such as when the item has been picked up (e.g., by the original supplier or a representative thereof or even a third party courier). In addition, inventories may be updated to reflect the return. This may include the inventories of both the supplier and/or the user of the items being returned (or, where such items are containers or the like, the users of articles formerly packaged in the items). In some cases, one or more of these inventories may be updated automatically upon receipt of the notification message and/or in response to receipt of the item identification information. Of course, once the notification messages have been received, pick-up times can also be scheduled.

In a further embodiment, a system that includes an RFID interrogator system having a reader and one or more antennas coupled to the reader; and a computer system coupled to the RFID interrogator system and configured to receive item identification information from the RFID interrogator system, the item identification information being associated with an RFID tag scanned by the RFID interrogator system, and to transmit a notification message indicating that an item identified by the item identification information is available for pick-up is provided. As before, the item identified by the item identification information may be a container. The antennas of the RFID interrogator system are preferably arranged so as to establish an electromagnetic field threshold around and within a return area when the antennas are used to transmit RFID interrogation signals. The return area may be a cabinet or simply a designated area of a building or other establishment. Any or all of the above-described forms of notification messages and/or procedures may be used and, often, the notification message includes at least a portion of the item identification information.

The computer system may be configured to transmit the notification message to one or more remote computer systems via one or more computer networks. Such a remote computer system may be configured to credit an account to reflect return of the item, either before or after the item is actually picked-up from the return area. The computer system may also be configured to update an inventory to reflect return of the item.

The present system may also include an entry authorization system coupled to the computer system and configured to provide person identification information to the computer system. This entry authorization system may include a scanner configured to receive electronic information, including the person identification information, from an identification card. Alternatively, the entry authorization system may utilize the reader to scan RFID tags associated with individuals picking up or dropping off items from/to the return area. In either case, the computer system may be configured to associate the person identification information with the item identification information in a computer readable database and/or to generate an alert message where unauthorized access to the return area is attempted.

BRIEF DESCRIPTION OF THE DRAWINGS

The present invention is illustrated by way of example, and not limitation, in the figures of the accompanying drawings in which.

DETAILED DESCRIPTION

Figure 1A:
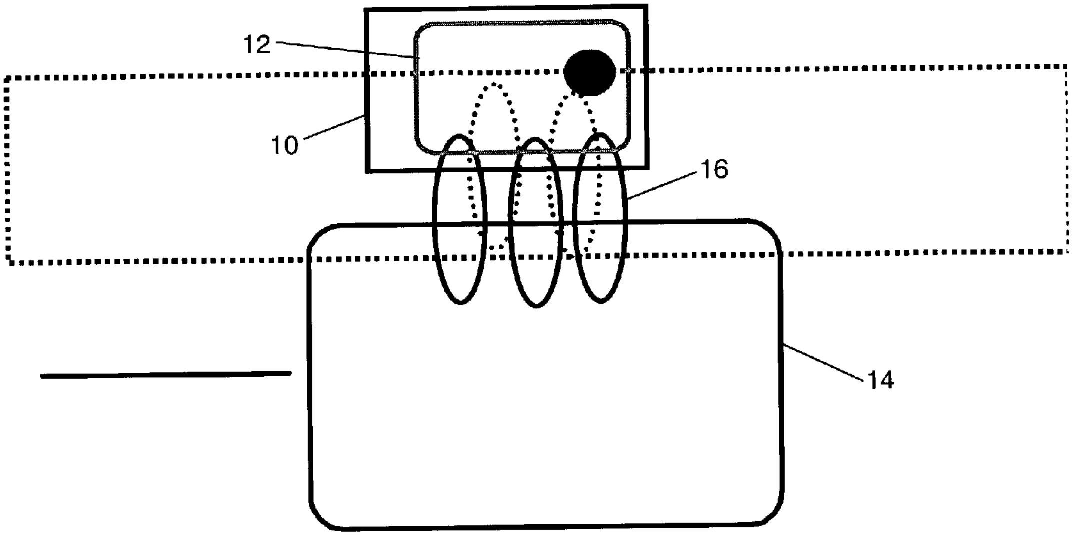
FIG. 1A illustrates the operation of a conventional passive RFID tag.
Figure 1B:
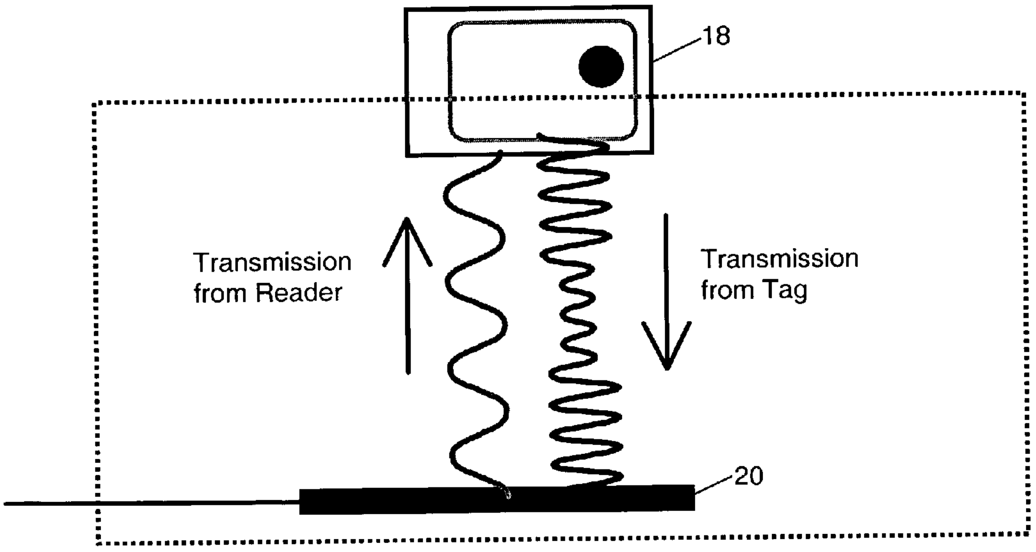
FIG. 1B illustrates the operation of a conventional active RFID tag.
Figure 2:
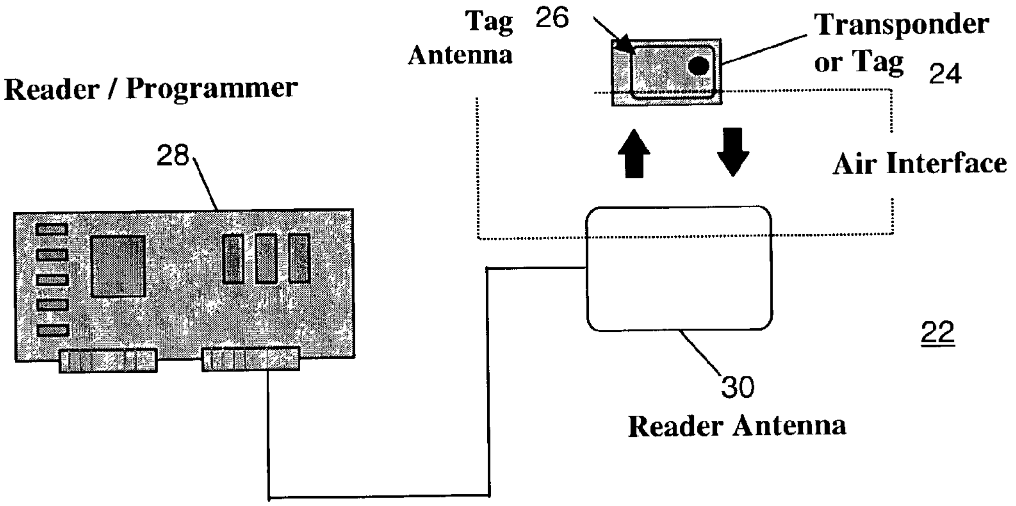
FIG. 2 illustrates the components of a conventional RFID system.
Figure 3:
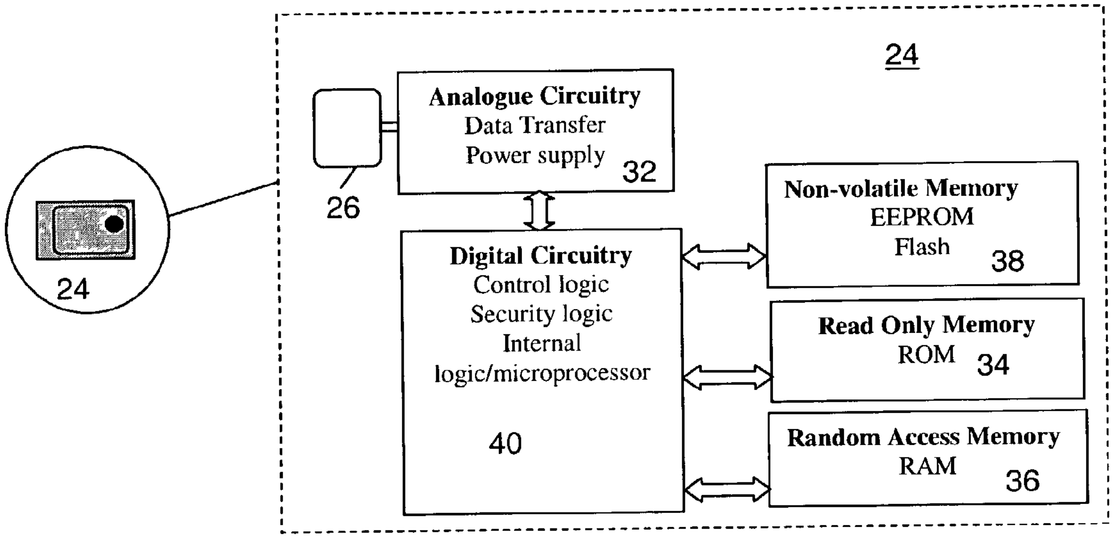
FIG. 3 illustrates in detail the components of a conventional RFID tag.

Described herein is a scheme for confirming the return and/or pick-up of valuable items, such as high value shipping containers and similar items. This scheme allows for the automatic updating of accounts to reflect the return of these high value (or other) items, and thus fills a void left by systems of the past. Systems configured in accordance with the present invention share some aspects of prior remote locator or inventory management systems that use RFID tags and interrogators to monitor, control and manage the transport of materials to provide real-time and near real-time information regarding the location and status of such materials. However, unlike the prior systems discussed above, the present invention incorporates computer and other systems configured to automatically credit accounts and/or inventories to reflect the return of high value (or really any) items, such as shipping containers and the like.

Although discussed with reference to the example of high value containers for other items, the present invention is equally applicable to any of a variety of situations where articles are returned to one or more suppliers for credit. Therefore, the use of the terms item or container or similar terms herein should not be read as being limited to this application but should instead be read as encompassing any article that is returned (or returnable) for a credit (whether monetary or otherwise). Also, the term "supplier" is used in the broadest sense to mean any person or entity involved in the supply chain for an item or items. Thus, a supplier may be a manufacturer, distributor, agent, shipper, courier, or other person or entity in the supply chain.

In addition, the examples of RFID systems discussed herein should be understood as being just that, examples only, and should not be read as restricting the broader scope of the present invention. The reason for using and discussing the examples herein is to provide the reader with an easy to understand application in which the present invention may find use. Readers will understand that it would be overly tedious and unnecessary to explain in detail or even list each and every possible application and/or configuration of the present invention, in part because such a list would not significantly contribute to the communication of the central ideas which make up the present invention and, besides, these broad concepts are described and encompassed in the claims which follow this description.

Some portions of this detailed description are presented in terms of algorithms and/or symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 4:
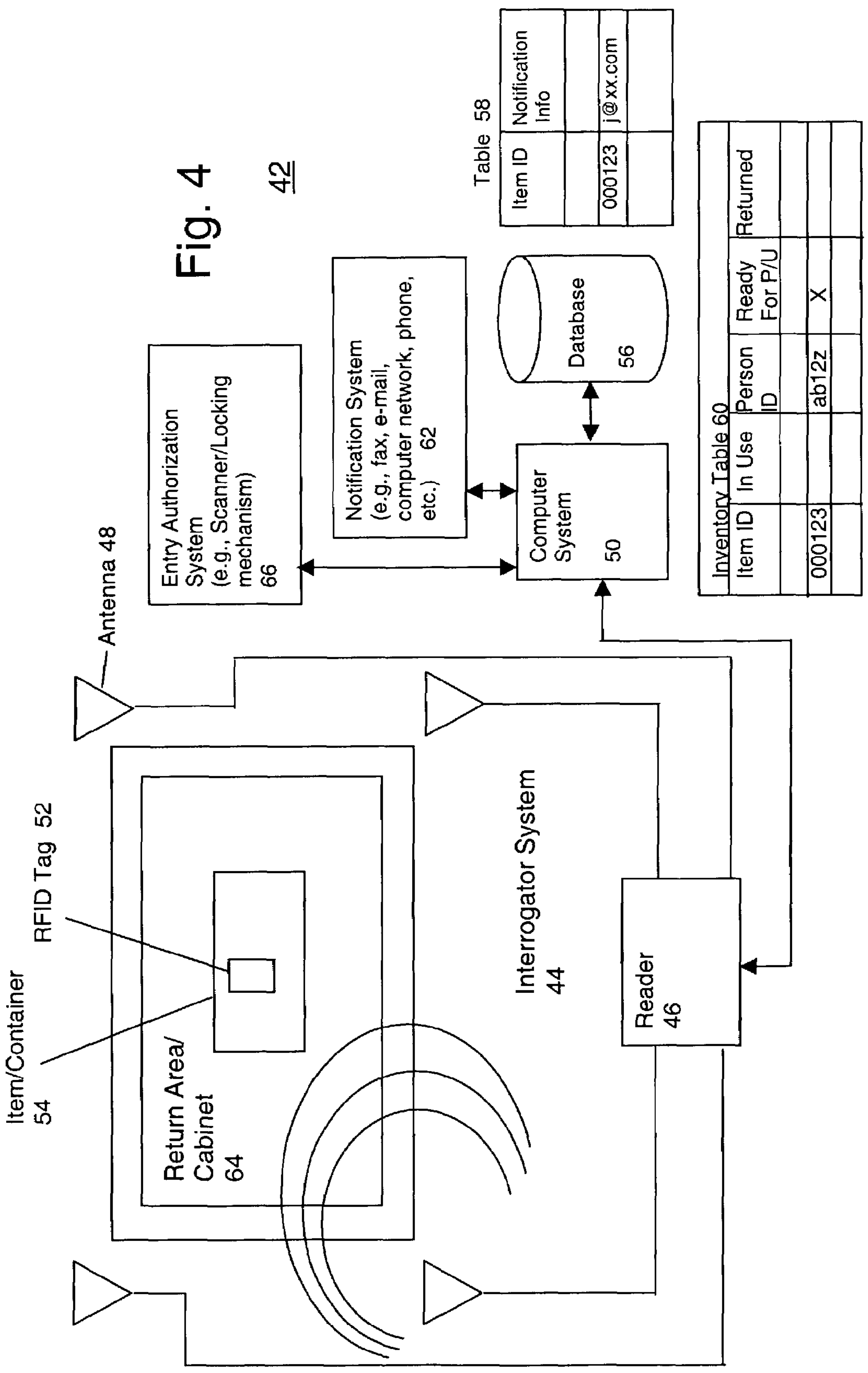
FIG. 4 illustrates an example of an RFID system configured for use with a computer system in accordance with an embodiment of the present invention.

With the above in mind, refer now to FIG. 4, which illustrates a system 42 configured in accordance with an embodiment of the present invention. System 42 includes an RFID interrogator system 44 having a reader 46 and one or more antennas 48 coupled to the reader. A computer system 50 is coupled to the RFID interrogator system 44 and is configured to receive item identification information from the RFID interrogator system 44.

The item identification information is associated with one or more RFID tags 52 scanned by the RFID interrogator system 44. Each RFID tag 52 is associated with (e.g., affixed to) an item (e.g., a container) 54. Item 54 may be a high value item such as a shipping container or it may be any item that is eligible for credit upon return. The RFID tags 52 may be active or passive tags and the reading of the item identification information (which is pre-stored in the tag memory) takes place in the conventional fashion. Thus, for passive tags, when the RFID tag 52 is within an electromagnetic field created by one or more of the antennas 48, the tag is activated and the item identification information is transmitted to the reader 46 in the conventional fashion.

From the reader 46, the item identification information may be transferred to the computer system 50 across a bus or other connection (which may even be a wireless communication link). In some cases, the reader 46 will be a peripheral device coupled to the computer using a conventional computer communication bus, such as a Universal Serial Bus (USB), a Peripheral Component Interconnect (PCI) bus, a Small Computer System Interface (SCSI) bus, a bus that complies with the Personal Computer Memory Card International Association (PCMCIA) standard, or another conventional computer bus. The reader 46 may even be implemented as a PC Card or other add-in card for a computer system. The precise configuration of the reader 46 and/or its connection to the computer system 50 (which may be a conventional personal computer configured with software to perform the processes described herein) is not critical to the present invention.

The item identification information can be any information, such as a serial number, part number, etc. useful for identifying the item 54. In some cases, the item identification information includes other information such as a notification address, as discussed below, or information regarding the supplier, the customer (i.e., the identity of the person or company to which the item was shipped), the date of shipping, expiration dates, and so on. Indeed, any relevant information regarding the item, the supply chain or other information can be included in the item identification information.

Once the RFID tag 52 associated with item 54 is scanned to obtain the item identification information, that information is provided to the computer system 50. The computer system 50 may store this information in a database 56, which may be a designated portion of any computer readable storage medium, such as a hard disk drive, a floppy disk, or other storage medium. The item identification information (e.g., a serial number 000123) may be stored in a variety of fashions, for example as entries in one or more tables, such as table 58, which are used to associate item identification information with notification information, and/or an inventory table 60 which may provide such information as whether the item is currently in use, whether it is ready for pick-up, whether it has already been returned, etc.

After the computer system 50 receives the item identification information (and stores it in database 56), a notification message indicating that the item 54 is available for pick-up is transmitted, for example to a supplier of the item. The notification message may be transmitted as any or all of: a facsimile message, a telephone message, a pager message, a voice synthesized message, an e-mail message, or an electronic message. Preferably, the notification message is automatically transmitted by the computer system 50, and may include at least a portion of the item identification information.

In general, the notification message will be transmitted to a notification address associated with the item identification information. This notification address may be a telephone number, a facsimile number, a pager number, an e-mail address, or a computer system address (e.g., a network or Internet address, etc.). The notification address may be obtained, using the item identification information, from a table (e.g., table 58) stored in a computer readable medium, or, in some cases, from the RFID tag 52 itself during the scanning operation. That is, the item identification information may include the notification address to which the notification message is to be transmitted.

The computer system 50 is coupled to a notification system 62, which is used to transmit the notification message. Notification system 52 may be a conventional computer modem (internal or external) or computer network interface card to facilitate transmissions of e-mail, facsimile, pager, telephone or electronic messages. In the case of telephone messages, the notification system 62 will be equipped with a conventional voice synthesizer to facilitate reproduction of audible sounds. In some cases, the notification system 62 will connect computer system 50 to the Internet to allow for notification messages to be passed via that medium, however, this is not critical to the present invention. In general, the supplier of item 54 can choose the type of notification message to be received and, hence, will have selected the notification means used by computer system 50. When a notification message is transmitted, inventory table 60 may be updated to reflect the fact that an associated item is ready for pick-up.

The scanning process discussed above is preferably performed at the time an item 54 is placed in an area 64 designated for articles (such as high value containers or other items) to be returned. This area may be a cabinet or it may simply be a designated area within a building, such as a storage room. In some cases, the area need not even be physically walled off from surrounding areas, so a cubicle space or indeed any otherwise unused floor space or shelf space, etc. can be designated as the "return area". Different return areas may be designated for items associated with different suppliers or one common return area may be used for all items 54. These details are not critical to the present invention.

Regardless of how it is configured, the return area will be defined by an electromagnetic field or threshold provided by the RFID interrogator system 44 so that tags 52 within the boundary defined by this RFID scanning field are read. Of course, the tags may be active or passive tags, as appropriate, and periodic rescanning of the RFID tags within the return area may be performed (e.g., to ensure items that were placed in the return area are still there).

In addition to the above, other RFID tags, for example tags associated with one or more persons handling the items to be returned (not shown), may be scanned to obtain person identification information. This person identification information may be associated with the item identification information in a computer readable database (e.g., database 56 as part of inventory table 60) so as to keep track of which individuals are placing items in or removing items from the return area 64. The RFID tags (which may be included in identity cards or badges) may be scanned at a time when the associated individual delivers an item to or retrieves an item from the return area 64. In other cases, the person identification information may be obtained thorough the use of individual identity codes or passwords read from magnetic stripes associated with ID cards or badges or the like, or simply entered through a keyboard or other manual input device.

In some cases, the person identity information may be used to grant or not grant access to the return area. For example, computer system 50 may be coupled to an associated entry authorization system 66 that is used to control access to return area 64. The entry authorization system 66 may include a scanner (RFID reader, magnetic stripe reader, keyboard entry device, etc.) that is used to obtain the person identification information and pass it to computer system 50. Computer system 50 may then compare the person identification information to a list of persons with authorized access to return area 64. If the person identification information that was received by entry authorization system 66 corresponds with an authorized person, computer system 50 may instruct the entry authorization system 66 to grant access to return area 64, for example by unlocking a door or other barrier. Otherwise, the computer system 50 may instruct the entry authorization system 66 to prevent access to the return area 64 and may also signal an alert indicating that an unauthorized access is being attempted.

Figure 5:
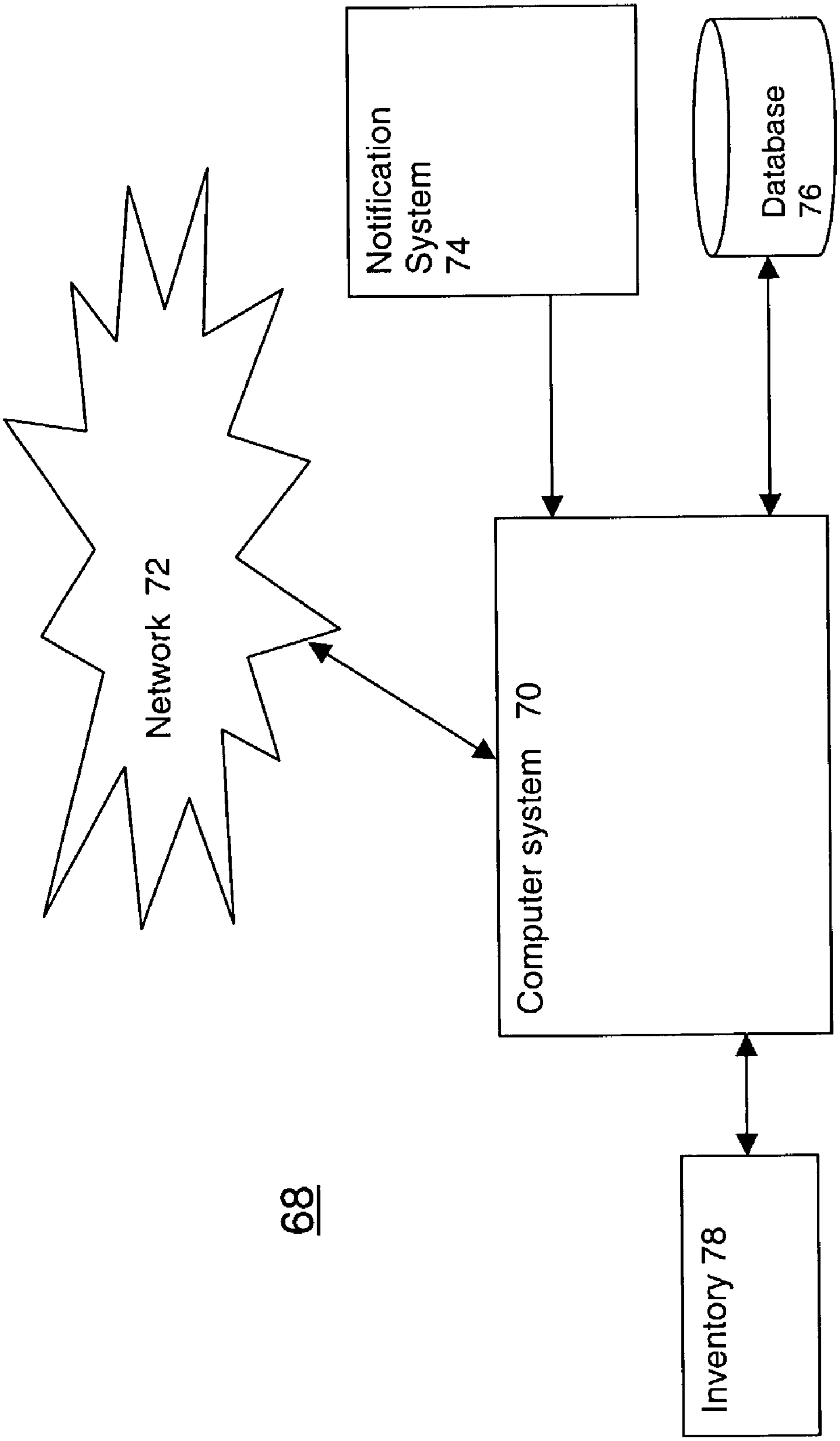
FIG. 5 illustrates an example of a computer system maintained by a supplier of items (such as high value containers) configured for use in accordance with an embodiment of the present invention.

As indicated above, computer system 50 may be configured to transmit the notification message to one or more remote computer systems via one or more computer networks. Turning now to FIG. 5, an example of such a remote system 68 is illustrated. The remote system 68 may be maintained by a supplier of items 54 that can be returned for a credit. This may be a monetary or other credit and such details are not critical to the present invention. Such a remote system 68 may be configured to credit an account (e.g., a customer's account) to reflect return of one or more items 54, either before or after these items are actually picked-up from the return area 64. The system 68 may also be configured to update an inventory to reflect return of these items.

Remote system 68, which is only an example of such systems, includes a computer system 70, which may be a conventional personal computer or other computer system, coupled to a computer network 72. The network 72 may be the Internet or a local or wide area computer network. Regardless of the type of network, this connection provides one avenue for receiving notification messages from computer system 50. For example, e-mail or other electronic messages (e.g., instant messages, messages submitted through web forms or the like or via extensible markup language (XML) commands, etc.) may be passed between these computer systems through network 72. In such cases, the notification system 62 may be a modem or network interface card that permits access to the network 72.

Remote system 68 may also include other means of receiving notification messages, such as through notification system 74. This may be a facsimile receiver that allows computer system 70 to receive facsimile messages (e.g., via a modem) and display them (either in hard copy or other form) for a person to read. Thereafter, the substance of the notification message would need to be entered in computer system 70 through manual means, for example using a keyboard and/or cursor control device such as a mouse, or possibly through an optical scanning and character recognition process that causes text information to be automatically entered in appropriate databases. In any event, the substance of the notification message may be stored in a database 76 and also used to update supplier inventories 78, for example to credit accounts to reflect return of the items 54.

The present system thus provides for automatically crediting an account to reflect return of the item upon receipt of the notification message. This may occur upon delivery of the item to the return area or at a later time such as when the item has been picked up (e.g., by the original supplier or a representative thereof or even a third party courier). In addition, inventories may be updated to reflect the return. This may include the inventories of both the supplier and/or the user of the items being returned (or, where such items are containers or the like, the users of articles formerly packaged in the items). In some cases, one or more of these inventories may be updated automatically upon receipt of the notification message and/or in response to receipt of the item identification information. Of course, once the notification messages have been received, pick-up times can also be scheduled.

Figure 6:
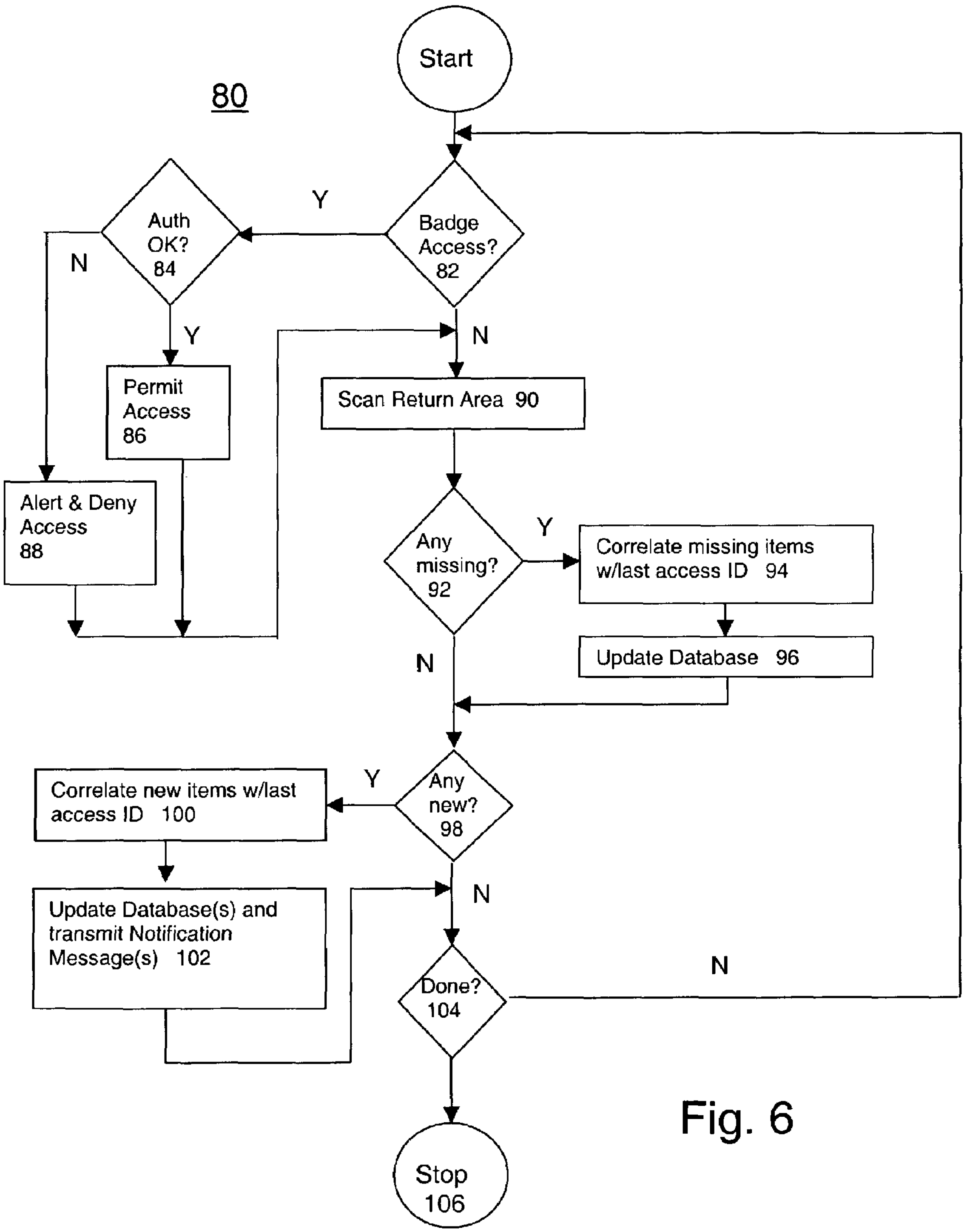
FIG. 6 is a flow chart illustrating an example of a process for scanning RFID tags and transmitting associated notification messages indicating that items are available for pick-up in accordance with an embodiment of the present invention.

Referring now to FIG. 6, an example of a computer software process for computer system 50 is illustrated in the form of a flow chart. It should be remembered that this is only an example and many other software routines that implement the same functionality can also be generated and used. Also, process 80 illustrated in the flow chart includes optional items, such as authorization checking, that need not necessarily be implemented.

In this example, process 80 begins with an optional step 82 where a check is made to determine if anyone is seeking access to return area 64. This check may be made in a variety of ways. For example, computer system 50 may read one or more registers where person identification information from entry authorization system 66 is stored upon an attempted access. Alternatively, the check may be made in response to a hardware or software interrupt and need not necessarily be part of the regular program flow for computer system 50.

If an access is being attempted, the process performs a check at step 84 to determine whether the person attempting access is authorized for such access. As indicated above, this may be made by comparing the person identification information received from entry authorization system 66 to a list of authorized personnel and checking for a match. If a match is found, then access is permitted (step 86), otherwise access is denied and an alert is raised (step 88).

Regardless of whether or not the above described authorization access is performed, at step 90 the computer system 50 calls on the reader 46 to perform a scan of the return area 64. Alternatively, these scans may be performed autonomously and the results simply provided to a file to be read by computer system 50 at step 90. In either case, the present process performs a check to determine if any items 54 have been removed from the return area 64 since the time of the last scan. This can be done by comparing a list of the RFID tags (e.g., using the item identification information therefrom) that were read during the last scan to those read during the present scan.

If any items 54 are deemed missing, the item identification information for the missing tags 52 (i.e., items 54) is correlated with the person identification information for the last authorized access. In this way, the identity of the person who removed an item from return area 64 can be tracked, along with an indication of which item(s) he or she removed. This information may be used to update a database (step 96) so that a record of returns or at least item removals from return area 64 can be maintained.

In addition to determining whether any items 54 have gone missing from the return area 64 since the last scan, the present process also checks to see whether any new items have been placed in the return area 64 (step 98). As before, this can be done by comparing the item identification information received from tags during the prior scan to such information received from tags during the current scan and noting any new items. These new items (i.e., the item identification information associated with these new items) can be correlated with the person identification information for the person that made the last authorized access to return area 64 (step 100) so as to keep a record of which individuals are placing items in the return area 64. Thereafter, databases can be updated as discussed above, and appropriate notification messages transmitted to the corresponding notification addresses (step 102) to indicate any new items available for pick-up.

Finally, a check is made at step 104 to determine if the process is to quit. If not, the entire process (or selected portions thereof) repeat, until the program is instructed to quit (step 106).

Figure 7:
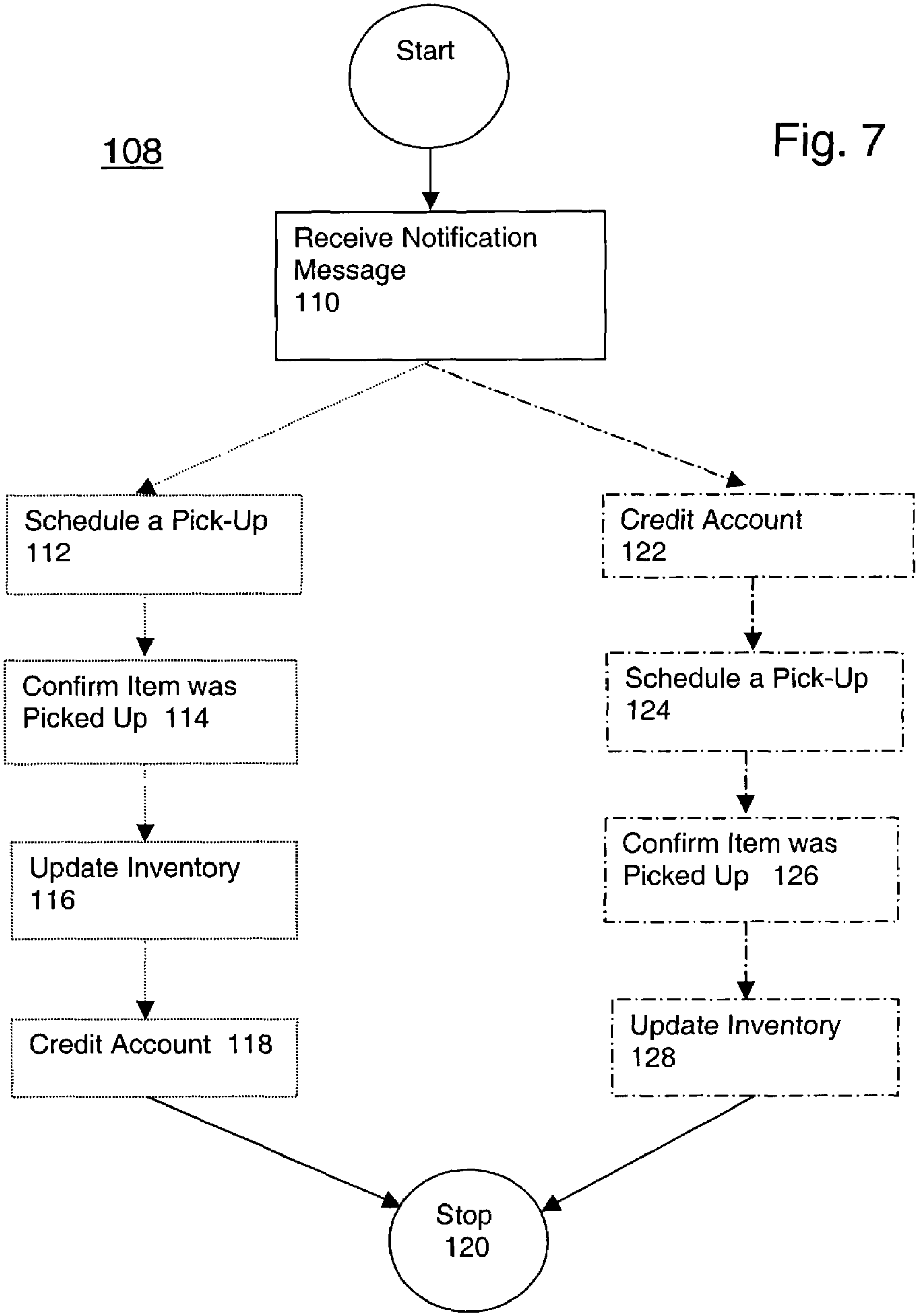
FIG. 7 is a flow chart illustrating examples of alternative processes for crediting accounts to reflect returns of items in accordance with an embodiment of the present invention.

FIG. 7 illustrates a pair of alternative processes 108 for execution by a remote system 68. Each of the processes begins with receipt of the notification message at step 110. As indicated above, this may come via manual input at computer system 70 or, preferably, automatically through a computer-to-computer electronic message. In the first of threes alternative processes, after receipt of the notification message, a pick-up of the item is scheduled (step 112). Again, this may be a manual process or, preferably, an automatic one wherein a pick-up date and time is scheduled via e-mail or other electronic message. Of course, facsimile, telephone or any other communication means may be used to schedule the pick-up and in some cases, pick-ups may be prearranged for certain dates/times in advance (e.g., where a regular pick-up schedule is used).

Thereafter, at step 114, the remote system receives confirmation that an item was picked up. This may occur through automatic updating of a database (e.g., by scanning the RFID tag of the returned item at the supplier's return center) or by manual input. In response, inventories may be updated (step 116) and the customer's account credited (step 118) to reflect return of the item. The process then quits at step 120.

Alternatively, the crediting of the account may occur directly and automatically upon receipt of the notification message, as indicated at step 122. This may be preferable for users of items 54, because it places the responsibility for ensuring that the container or other item is actually delivered to the supplier in the supplier's hands, and the user need only ensure delivery to return area 64 (which is often located on the user's premises). Later, at step 124, a pick-up can be scheduled and upon confirmation of the pick-up (step 126) the inventories can be updated (step 128).

Thus a scheme for confirming the return and/or pick-up of valuable items, such as high value shipping containers and the like, has been described. Although discussed with reference to several illustrated embodiments, it bears repeating that these have merely been examples of the application of the present invention. Other embodiments of the present invention also exist and are intended to be covered hereby. For example, although discussed primarily with respect to containers, the present invention finds equal applicability to other articles that may be returned for credit as well. Thus, the full scope present invention should only be measured in terms of the claims, which follow.

What is claimed is:

1. A system, comprising:

an RFID interrogator system including a reader and one or more antennas coupled to the reader;

a computer system coupled to the RFID interrogator system and configured to receive item identification information from the RFID interrogator system, the item identification information being associated with an RFID tag scanned by the RFID interrogator system, and to transmit a notification message to a notification address at one or more remote computer systems indicating that an item identified by the item identification information is available for pick-up, wherein at least one of the remote computer systems is configured to credit an account to reflect return of the item; and an entry authorization system, utilizing the reader, coupled to the computer system and configured to provide person identification information to the computer system, wherein the notification message is transmitted to a notification address obtained using the item identification information.

2. A system, comprising:

an RFID interrogator system including a reader and one or more antennas coupled to the reader;

a computer system coupled to the RFID interrogator system and configured to receive item identification information from the RFID interrogator system, the item identification information being associated with an RFID tag scanned by the RFID interrogator system, and to transmit a notification message to a notification address at one or more remote computer systems indicating that an item identified by the item identification information is available for pick-up, wherein at least one of the remote computer systems is configured to credit an account to reflect return of the item; and an entry authorization system, utilizing the reader, coupled to the computer system and configured to provide person identification information to the computer system, wherein the notification message is transmitted to a notification address obtained from the RFID tag.

3. A system, comprising:

an RFID interrogator system including a reader and one or more antennas coupled to the reader;

a computer system coupled to the RFID interrogator system and configured to receive item identification information from the RFID interrogator system, the item identification information being associated with an RFID tag scanned by the RFID interrogator system, and to transmit a notification message to a notification address indicating that an item identified by the item identification information is available for pick-up, wherein the notification address is obtained using the item identification information; and an entry authorization system, utilizing the reader, coupled to the computer system and configured to provide person identification information to the computer system.

4. The system of claim 3, wherein the notification message is transmitted to a notification address obtained from the RFID tag.

5. The system of claim 3, wherein the computer system is configured to transmit the notification message to one or more remote computer systems via one or more computer networks.

* * * * *

UNITED STATES PATENT AND TRADEMARK OFFICE

CERTIFICATE OF CORRECTION

PATENT NO. : 7,267,262 B1
APPLICATION NO. : 10/213263
DATED : September 11, 2007
INVENTOR(S) : Brown It is certified that error appears in the above-identified patent and that said Letters Patent is hereby corrected as shown below:

In the Application Title on the face of the patent at (54) and col. 1 line 1-3:

Delete "METHOD AND APPARATUS CONFIRMING RETURN AND/OR PICK-UP VALUABLE ITEMS" and replace with "METHOD AND APPARATUS FOR CONFIRMING RETURN AND/OR PICK-UP OF VALUABLE ITEMS"

Signed and Sealed this
Twenty-second Day of November, 2011

David J. Kappos
*Director of the United States Patent and Trademark Office*